(12) United States Patent
Shin et al.

(10) Patent No.: US 10,611,255 B2
(45) Date of Patent: Apr. 7, 2020

(54) DEVICE AND METHOD FOR CHARGING ELECTRIC VEHICLE WITH DIFFERENT CHARGING STANDARDS

(71) Applicant: LG INNOTEK CO., LTD., Seoul (KR)

(72) Inventors: Kwang Seob Shin, Seoul (KR); Do Hyeong Kim, Seoul (KR); Hyoung Dong Kim, Seoul (KR); Myoung Kyu Rhee, Seoul (KR); Myung Keun Lim, Seoul (KR); Soo Bum Cho, Seoul (KR); Jeong Jae Jo, Seoul (KR); Yong Hyun Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 150 days.

(21) Appl. No.: 15/743,152

(22) PCT Filed: Jul. 8, 2016

(86) PCT No.: PCT/KR2016/007431
§ 371 (c)(1),
(2) Date: Jan. 9, 2018

(87) PCT Pub. No.: WO2017/010750
PCT Pub. Date: Jan. 19, 2017

(65) Prior Publication Data
US 2018/0201147 A1    Jul. 19, 2018

(30) Foreign Application Priority Data

Jul. 10, 2015  (KR) .................. 10-2015-0098268
Feb. 1, 2016   (KR) .................. 10-2016-0012321

(51) Int. Cl.
*H01M 10/44*  (2006.01)
*H01M 10/46*  (2006.01)
(Continued)

(52) U.S. Cl.
CPC ........... *B60L 11/1838* (2013.01); *B60L 53/11* (2019.02); *B60L 53/14* (2019.02); *B60L 53/20* (2019.02);
(Continued)

(58) Field of Classification Search
CPC ........ H02J 7/0021; H02J 7/0026; H02J 7/355; H02J 7/0042; H02J 7/007; H02J 7/0072; H02J 7/04
(Continued)

(56) References Cited

U.S. PATENT DOCUMENTS

2013/0020993 A1*  1/2013  Taddeo ................. H02J 7/0027
                                                   320/109
2013/0214738 A1   8/2013  Chen et al.
(Continued)

FOREIGN PATENT DOCUMENTS

JP    2011-35975 A    2/2011
KR    2010-283944 A   12/2010
(Continued)

OTHER PUBLICATIONS machine translate of JP 2011-035975 (Toyota Motor), dated Feb. 17, 2011 (patent application 2009/177653) (Year: 2011).*

*Primary Examiner* — Edward Tso
(74) *Attorney, Agent, or Firm* — Birch, Stewart, Kolasch & Birch, LLP

(57) ABSTRACT

A device for charging an electric vehicle according to an embodiment of the present invention comprises: a charging inlet for receiving charging information and power from electric vehicle supply equipment (EVSE); a control module for determining a charging mode on the basis of the charging information, and outputting a control signal according to the determined charging mode; and a charging unit for charging (Continued)

a battery of the electric vehicle according to the control signal from the control module.

14 Claims, 6 Drawing Sheets

(51) Int. Cl.
| | | |
|---|---|---|
| *B60L 11/18* | (2006.01) | |
| *H02J 7/00* | (2006.01) | |
| *H04L 12/10* | (2006.01) | |
| *B60L 53/20* | (2019.01) | |
| *B60L 53/14* | (2019.01) | |
| *H02J 7/02* | (2016.01) | |
| *B60L 53/60* | (2019.01) | |
| *B60L 53/10* | (2019.01) | |
| *H02J 7/04* | (2006.01) | |
| *H04L 12/40* | (2006.01) | |

(52) U.S. Cl.
CPC ............ *B60L 53/60* (2019.02); *H02J 7/0027* (2013.01); *H02J 7/0072* (2013.01); *H02J 7/025* (2013.01); *H02J 7/04* (2013.01); *H04L 12/10* (2013.01); *H04L 12/40* (2013.01); *B60L 2210/40* (2013.01); *H02J 2007/0098* (2013.01); *H04L 2012/40273* (2013.01); *Y02T 10/7005* (2013.01); *Y02T 90/14* (2013.01); *Y02T 90/16* (2013.01)

(58) Field of Classification Search
USPC ................ 320/104, 109, 125, 132, 137, 138
See application file for complete search history.

(56) References Cited

U.S. PATENT DOCUMENTS

| | | | |
|---|---|---|---|
| 2014/0091764 A1* | 4/2014 | Kinomura | ............... B60L 53/30 320/109 |
| 2014/0247019 A1 | 9/2014 | Park | |
| 2015/0224890 A1 | 8/2015 | Kim et al. | |
| 2015/0357837 A1* | 12/2015 | Takai | .................... H01M 10/44 320/107 |
| 2016/0276843 A1* | 9/2016 | Chang | ................... B60L 11/187 |

FOREIGN PATENT DOCUMENTS

| | | |
|---|---|---|
| KR | 10-1488586 B1 | 2/2015 |
| KR | 10-1524166 B1 | 6/2015 |

* cited by examiner

DEVICE AND METHOD FOR CHARGING ELECTRIC VEHICLE WITH DIFFERENT CHARGING STANDARDS

CROSS REFERENCE TO RELATED APPLICATIONS

This application is the National Phase of PCT International Application No. PCT/KR2016/007431, filed on Jul. 8, 2016, which claims priority under 35 U.S.C. 119(a) to Patent Application No. 10-2015-0098268, filed in the Republic of Korea on Jul. 10, 2015 and No. 10-2016-0012321, filed in the Republic of Korea on Feb. 1, 2016, all of which are hereby expressly incorporated by reference into the present application.

TECHNICAL FIELD

The present disclosure relates to an electric vehicle, and more particularly, to charging of an electric vehicle.

BACKGROUND ART

Eco-friendly vehicles such as electric vehicles (EVs) or plug-in hybrid electric vehicles (PHEVs) use electric vehicle supply equipment (EVSE) installed in a charging station to charge a battery thereof.

For interaction between EVs and the EVSE, various standards have been actively established. Charging standards for an EV may be broadly classified into a charging system, a charging interface, a communication protocol, etc.

However, the standards are differently adopted according to countries or automobile companies, and therefore a charging device, a battery pack, a battery management system (BMS), and the like for an EV have to be developed and designed depending on the different standards. Accordingly, there are problems in that costs and time needed to develop the device for charging an EV are increased.

DISCLOSURE

Technical Problem

The present disclosure is directed to providing a charging control device for an electric vehicle and a charging device including the same.

Technical Solution

According to one embodiment of the present disclosure, a device for charging an electric vehicle includes: a charging inlet configured to receive charging information and power from electric vehicle supply equipment (EVSE); a control module configured to determine a charging mode based on the charging information and output a control signal in accordance with the determined charging mode; and a charger configured to charge a battery of the electric vehicle in accordance with the control signal of the control module.

The control module may include: a selector configured to determine the charging mode based on the charging information received from the charging inlet; a switching section configured to select a task section corresponding to the selected charging mode on the basis of information of the selector; and a plurality of task sections configured to output control signals corresponding to different charging modes so that charging in the different charging modes is performed.

The charging information may include one or more selected from the group consisting of cable information, charging type information, charging voltage/current information, a rated voltage, and charging time information.

The different charging modes may include two or more selected from the group consisting of a combo mode, a first combo type mode, a second combo type mode, a CHAdeMO mode, an AC 3-phase mode, and a GB/T (China DC) mode.

The switching section may include one selected from the group consisting of a metal oxide semiconductor field effect transistor (MOSFET), a gate turn off (GTO) thyristor, an insulated gate bipolar transistor (IGBT), and a silicon controlled rectifier (SCR).

The device for charging the electric vehicle may further include an inverter.

The device for charging the electric vehicle may further include a communicator configured to communicate with the EVSE.

According to one embodiment of the present disclosure, a method of charging an electric vehicle includes: collecting charging information from electric vehicle supply equipment (EVSE); determining a charging mode, based on the charging information; and performing charging of the electric vehicle in accordance with the determined charging mode.

The charging information may include one or more selected from the group consisting of cable information, charging type information, charging voltage/current information, a rated voltage, and charging time information.

The charging mode may include one or more selected from the group consisting of a combo mode, a first combo type mode, a second combo type mode, a CHAdeMO mode, an AC 3-phase mode, and a GB/T (China DC) mode.

According to one embodiment of the present disclosure, a charging control device for an electric vehicle includes a first communication channel configured to be connected with EVSE; a second communication channel configured to be connected with the EVSE; a third communication channel configured to be connected with an electronic control unit (ECU) of the electric vehicle; and a controller configured to be connected with the first communication channel, the second communication channel, and the third communication channel, generate a signal for controlling charging of a battery using a signal received through the first communication channel or the second communication channel, and transmit the signal for controlling the charging of the battery to the ECU through the third communication channel.

The first communication channel and the second communication channel may be based on different protocols from each other.

The first communication channel may be based on a protocol of supporting at least one of power line communication (PLC) and pulse width modulation (PWM), and the second communication channel may be based on a protocol of supporting a controller area network (CAN).

The protocol for the first communication channel may comply with combined charging system (CCS) standards, and the protocol for the second communication channel may comply with CHArge de Move (CHAdeMo) standards or the China EV charging standards.

The third communication channel may be based on the protocol of supporting the CAN.

According to one embodiment of the present disclosure, a charging device for an electric vehicle includes a control pilot (CP) port configured to receive a CP signal through a charging cable connected to EVSE; a first communication channel configured to be connected with the CP port and be connected to the EVSE via the CP port; a second communication channel configured to be connected with the EVSE supporting CAN communication interface standards including CHAdeM, Chinese national standards, etc.; a third communication channel configured to be connected with an electronic control unit (ECU) of the electric vehicle; and a charging controller including a control unit connected with the first communication channel, the second communication channel, and the third communication channel, configured to exchange a signal for controlling charging of a battery using a signal received through the first communication channel or the second communication channel, and configured to transmit the signal for controlling the charging of the battery to the ECU through the third communication channel.

The charging device may further provide a proximity detection (PD) port for detecting proximity of the charging cable to a connector, and a protective earth (PE) port connected with a ground of the EVSE.

Advantageous Effects

According to an exemplary embodiment of the present disclosure, a charging control device and a charging device are provided to be universally applied without limitations to specific standards. Accordingly, it is possible to decrease time and costs needed to develop the charging control device and the charging device, and it is also possible to make parts simple.

MODES OF THE INVENTION

The present disclosure allows various changes and has many embodiments, and thus exemplary embodiments will be illustrated in the accompanying drawings and described. However, it will be appreciated that the present disclosure is not limited to the exemplary embodiments, and all modifications, equivalents and substitutes may be made without departing from the idea and technical scope of the present disclosure.

It will be understood that, although terms first, second, etc. may be used herein to describe various elements, the elements should not be limited by the terms. The terms are only used to distinguish one element from another. For example, a first element could be termed a second element, and, similarly, a second element could be termed a first element, without departing from the scope of the present disclosure. As used here, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, embodiments will be described in detail with reference to the accompanying drawings, in which like numerals refer to like elements throughout, and repetitive descriptions will be avoided.

Figure 1:
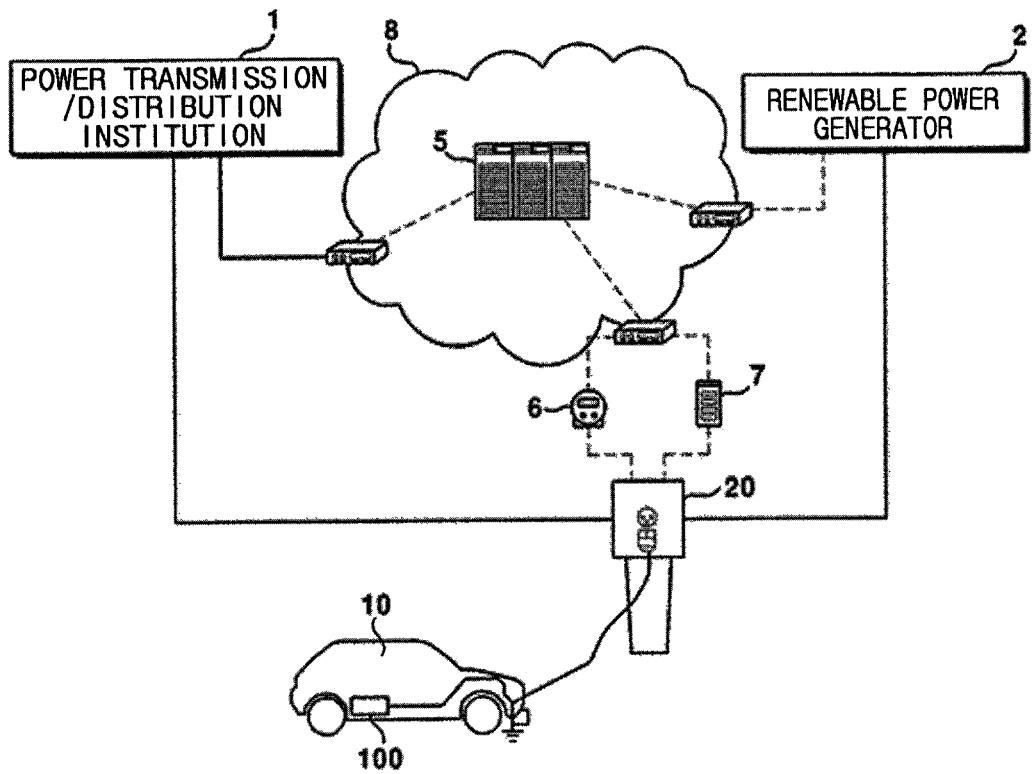
FIG. 1 is a schematic view of an electric vehicle charging system connected to a power grid.

FIG. 1 is a schematic view of an electric vehicle charging system connected to a power grid.

An overall process of charging an electric vehicle will be described with reference to FIG. 1. The electric vehicle includes a battery, and the battery may be directly or indirectly connected to external electric vehicle supply equipment (EVSE) 20. The EVSE 20 may receive power from a power source (or energy source) and supply the power to the electric vehicle. In general, the power source includes a grid such as a power corporation for generating and supplying electricity, a device capable of generating and/or supplying electricity other than the grid, and any power source as long as it can supply electricity to the EVSE 20. For example, a power transmission/distribution institution 1 and a renewable power generator 2 may be regarded as the power source. For example, the power transmission/distribution institution 1 may include a power station which is in charge of supplying primary power. Further, the renewable power generator 2 may include a power-recycling device including a distributed power source and a power storage system to generate secondary power. The EVSE 20 may be associated with a smart-grid (or intelligent power grid), which means a next-generation power system and a management system of the same, achieved by fusion and combination between modernized power technology and information and communication technology that have recently been on the rise.

Meanwhile, a central management server 5 manages a primary and/or secondary power business operator and the EVSE 20 to be associated with each other. In particular, the central management server 5 receives a power supply request from the EVSE, and manages the power to be supplied from the primary and/or secondary power business operator to the EVSE in response to the received power supply request. In this process, the central management server 5 may support and provide all necessary infrastructures, such as communication protocols and the like, for supplying/receiving the power in between a charging machine and the primary and/or secondary power business operators. The EVSE 20 may further include a local server 7 in communication with the central management server 5, and a smart meter 6 for controlling power demand/supply. In particular, the smart meter 6 may more precisely control the power demand/supply based on a demand/supply degree of power, billing-related information, etc. under the above-described smart-grid environment. The local server 7 provides an infrastructure so that necessary information may be collected and delivered between the power source and the electric vehicle and various control operations may be made on the basis of the information. For example, the local server 7 may receive additional information from the electric vehicle when the EVSE 20 connects with the electric vehicle. The local server 7 may make a request for the power source to supply necessary power based on the received additional information. A power information network 8 may provide various pieces of power information to the central management server, the power business operator and the device for charging the battery of the electric vehicle. The EVSE 20 includes a coupler as a connector, which is directly connected to and supplies power to an inlet provided in the electric vehicle, so that information about the electric vehicle may be transmitted to the local server 7 through connection between the inlet and the coupler, and the power received through the power source may be supplied to the electric vehicle through the coupler on the basis of the transmitted information, thereby charging the battery of the electric vehicle.

Figure 2:
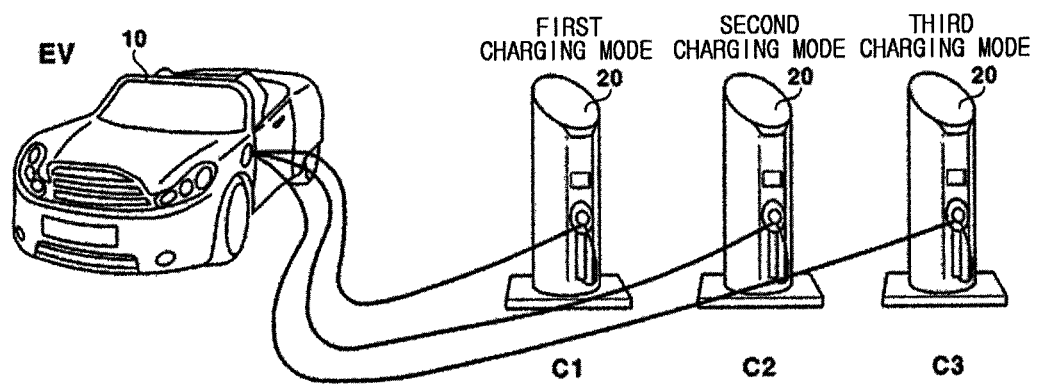
FIG. 2 is a schematic view for describing a present inventive concept.

FIG. 2 is a schematic view for describing a present inventive concept. As shown in FIG. 2, an electric vehicle charging device 100 according to the present disclosure may be mounted inside an electric vehicle (EV) 10. The electric vehicle charging device 100 may be connected to the external EVSEs which are different in a charging mode. The embodiment of FIG. 2 illustrates that the electric vehicle charging device 100 according to the present disclosure may be connected to an EVSE C1 of a first charging mode, an EVSE C2 of a second charging mode, and an EVSE C3 of a third charging mode. Although it is not illustrated, the EVSEs different in the charging mode from one another may be integrated into single equipment.

Figure 3:
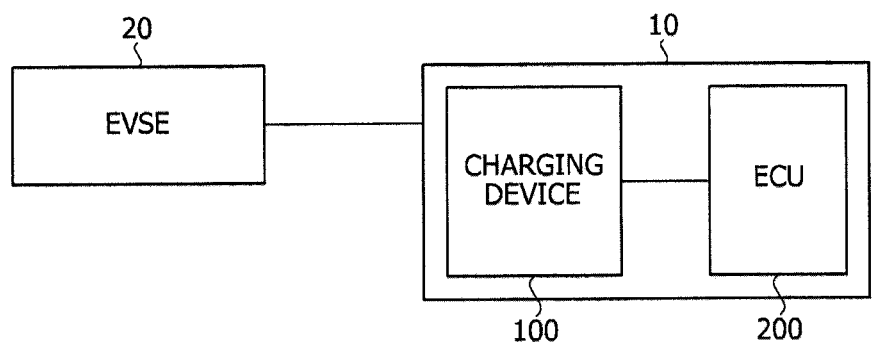
FIG. 3 is a block diagram of a charging system for an electric vehicle according to one embodiment of the present disclosure.

FIG. 3 is a block diagram of a charging system for an EV according to one embodiment of the present disclosure.

Referring to FIG. 3, the EV 10 may be charged from the EVSE 20. To this end, a charging cable connected with the EVSE 20 may be connected to an inlet of the EV 10. Here, the EVSE 20 refers to equipment for supplying an alternating current (AC) or direct current (DC), which may be placed in a charging station or at home, or may be portable. The EVSE 20 may be interchangeably used with a supply, an AC supply, a DC supply, a socket-outlet, etc.

The charging device 100 is included in the EV 10 and connected to an electronic control unit (ECU) 200 inside the EV 10.

Fast charging standards for the charging device 100 of the EV 10 are broadly classified into combined charging system (CCS) standards, and CHArgeing de Move (CHAdeMO) standards.

Between the above standards, the CCS standards refer to standards that power line communication (PLC) is introduced into a combo type charging port, in which a DC charging port and an AC charging port are integrated into one port, and have been led in the U.S. and Europe. Further, the CHAdeMO standards refer to standards that the DC charging port and the AC charging port are separated, and have been led in Japan. Besides, China has autonomously established the fast charging standards for the EV.

One embodiment of the present disclosure attempts to provide the charging device 100 capable of supporting all the various standards.

Figure 4:
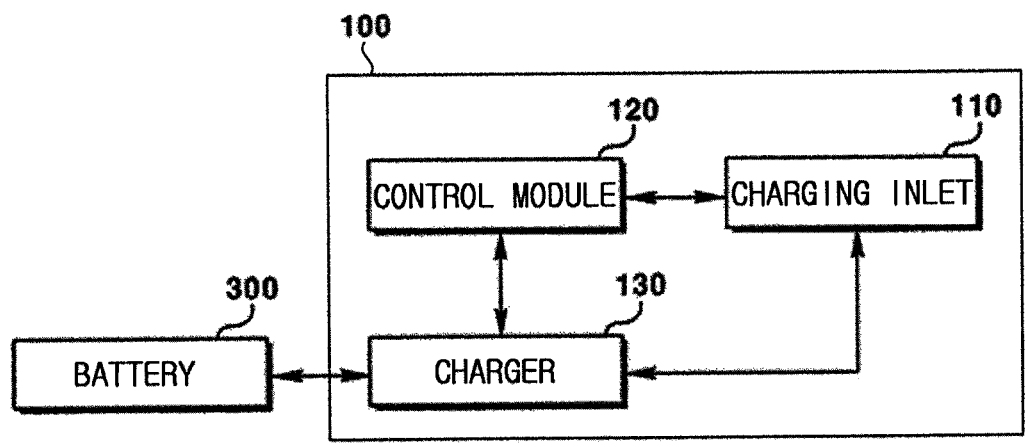
FIG. 4 is a block diagram of an electric vehicle charging device (100) according to one embodiment of the present disclosure.

FIG. 4 is a block diagram of an electric vehicle charging device 100 according to one embodiment of the present disclosure. The electric vehicle charging device 100 according to one embodiment of the present disclosure may be mounted to the inside of the EV and the like vehicle, but is not limited thereto.

Referring to FIG. 4, the electric vehicle charging device 100 according to one embodiment of the present disclosure includes a charging inlet 110, a control module 120, and a charger 130, and is connected to a battery 300. The charging inlet 110 serves as a connector to be connected to the external EVSE. That is, for example, the charging inlet 110 may be connected to a plug connector, a coupler or the like of the external EVSE 20, and receive power from the EVSE. For example, the charging inlet 110 may be connected to the external EVSE in a wired manner using a cable or the like, but is not limited thereto. The charging inlet 110 may be directly or indirectly connected to the external EVSE in a wired/wireless manner. Further, the charging inlet 110 may receive EVSE information, for example, cable information, a charging type, a rated voltage, charging time information, voltage/current information, etc. from the connected external EVSE.

The control module 120 receives the EVSE information from the charging inlet 110, outputs a control signal corresponding to the EVSE information, and controls the charger 130 to perform charging. The control module 120 may include one or more task sections 126, select a task section 126 corresponding to the EVSE information received from the charging inlet 110, and control the selected task section 126 to output the control signal. The control module 120 may transmit the control signal to the charger 130 and/or the charging inlet 110. A detailed configuration and operations of the control module 120 will be described below in detail with reference to FIG. 4.

The charger 130 may charge the battery 300 under a predetermined charging condition based on the control signal received from the control module 120. In this case, the control signal applied to the charger 130 may vary depending on which task section 126 is selected in the control module 120, and thus the charging condition of the charger 130 may also vary. For example, the charging condition may include voltage information, current information, charging time information, etc. Meanwhile, the charger 130 may be directly or indirectly connected to the charging inlet 110. In this case, the charging inlet 110 may receive the control signal from the control module 120 and transmit the received control signal to the charger 130.

The battery 300 may be directly or indirectly connected to the charger 130 and charged under a predetermined condition. Although it is not illustrated, the battery 300 may further include a discharger (not shown) to discharge electricity as necessary.

Although it is not illustrated, the electric vehicle charging device 100 may further include an inverter for converting AC/DC. In addition, the electric vehicle charging device 100 may further include a communicator (not shown) to communicate with an external device.

Figure 5:
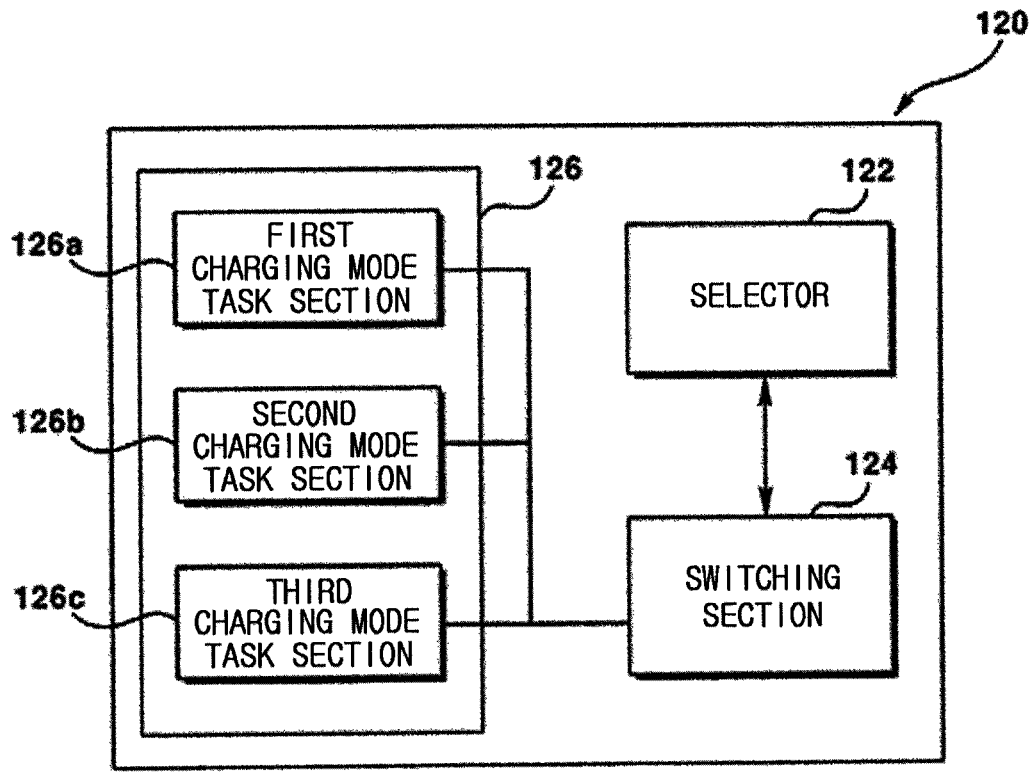
FIG. 5 shows one embodiment of a control module (120) in the electric vehicle charging device (100) according to the present disclosure.

FIG. 5 shows one embodiment of a control module 120 in the electric vehicle charging device 100 according to the present disclosure. Referring to FIG. 5, the control module 120 of the electric vehicle charging device 100 will be described. As shown in the drawing, the control module 120 includes a selector 122, a switching section 124, and the task section 126. The task section 126 may include one or more task sections different in mode from one another. For example, as shown in FIG. 5, the task section 126 may include a first charging mode task section 126*a*, a second charging mode task section 126*b*, and a third charging mode task section 126*c*, but is not limited thereto.

The selector 122 may be connected to the charging inlet 110 by, for example, a cable or the like. The selector 122 receives the charging information from the charging inlet 110 and determines the task section 126 corresponding to the received charging information. For example, the charging inlet 110 may collect connector information about the EVSE 20 connected to the electric vehicle charging device, and the selector 122 may determine the task section 126 based on the collected connector information. The switching section 124 receives the information from the selector 122 and selects the corresponding task section among one or more task sections 126. The switching section 124 may include a semiconductor switching device such as a metal oxide semiconductor field effect transistor (MOSFET), a gate turn off (GTO) thyristor, an insulated gate bipolar transistor (IGBT), a fast silicon controlled rectifier (SCR), and the like, but is not limited thereto.

Next, an example of determining the task section 126 by the selector 122 will be described. For example, in a case where the first charging mode is a combo charging mode, the second charging mode is a CHAdeMO charging mode, and the third charging mode is an AC 3-phase charging mode, when the connector information of the EVSE 20 collected by the charging inlet 110 denotes a first connector capable of using both DC power and single-phase AC power, the selector 122 may determine the first charging mode task section 126*a* as the corresponding task section based on the information. Further, when the connector information of the EVSE 20 collected by the charging inlet 110 denotes a second connector of using the DC power, the selector 122 may determine the second charging mode task section 126*b* as the corresponding task section based on the information. In addition, when the connector information of the EVSE 20 collected by the charging inlet 110 denotes a third connector of using the AC 3-phase power, the selector 122 may determine the third charging mode task section 126*c* as the corresponding task section based on the information.

The above-described embodiments are merely examples for helping understanding of the present disclosure, and therefore the connector information is not limited to the embodiments described above but applicable to any connector to be developed in the future.

As described above, the task section 126 may include task sections different in mode from one another. Referring to FIG. 5, the task section 126 may include the first charging mode task section 126*a*, the second charging mode task section 126*b*, and the third charging mode task section 126*c*. As described above, the EV has various types of charging such as a combo type charging, a CHAdeMO type charging, an AC 3-phase type charging, etc., and the task sections 126 different in mode from one another are capable of performing charging in different ways. For example, the first charging mode task section 126*a* may perform combo-type charging, the second charging mode task section 126*b* may perform CHAdeMO-type charging, and the third charging mode task section 126*c* may perform AC 3-phase-type charging. However, the above-described description is merely one embodiment of the present disclosure, and it will be thus obvious that the type of charging performed in each task section varies depending on design purposes and uses.

Here, the task sections 126 may be operated by software suitably designed for different types of charging. For example, the first charging mode task section 126*a* may be operated by software designed for the combo type charging, the second charging mode task section 126*b* may be operated by software designed for the CHAdeMO type charging, and the third charging mode task section 126*c* may be operated by software designed for the AC 3-phase type charging. That the task section 126 is operated by software suitably designed for each corresponding type of charging means that the task sections 126 output control signals for charging the EV in accordance with respective corresponding types of charging.

For example, when the first charging mode is of the combo type charging, the first charging mode task section 126*a* outputs a control signal so that the EV may be charged with DC power and AC power selectively supplied from a power source (not shown) for DC fast charging and AC fast charging. In this case, the charging condition such as a voltage/current condition, a charging time condition, etc. may be set by a user's input in accordance with design purposes and uses. Similarly, when the second charging mode is of the CHAdeMO type charging, the second charging mode task section 126*b* outputs a control signal so that the EV may be charged in a CHAdeMO manner. Also, when the third charging mode is of the AC 3-phase type charging, the third charging mode task section 126*c* outputs a control signal so that the EV may be charged with 3-phase AC power supplied from the power source (not shown).

In the above-described embodiment, the task section 126 of the electric vehicle charging system according to the preset disclosure includes three task sections 126*a* to 126*c* for just convenience of description, and this is not construed as limiting the present inventive concept. In other words, it will be obvious that the number of task sections and the charging modes processed by the task sections in the electric vehicle charging system according to the present disclosure are not limited to those of the above-described embodiment.

Figure 6:
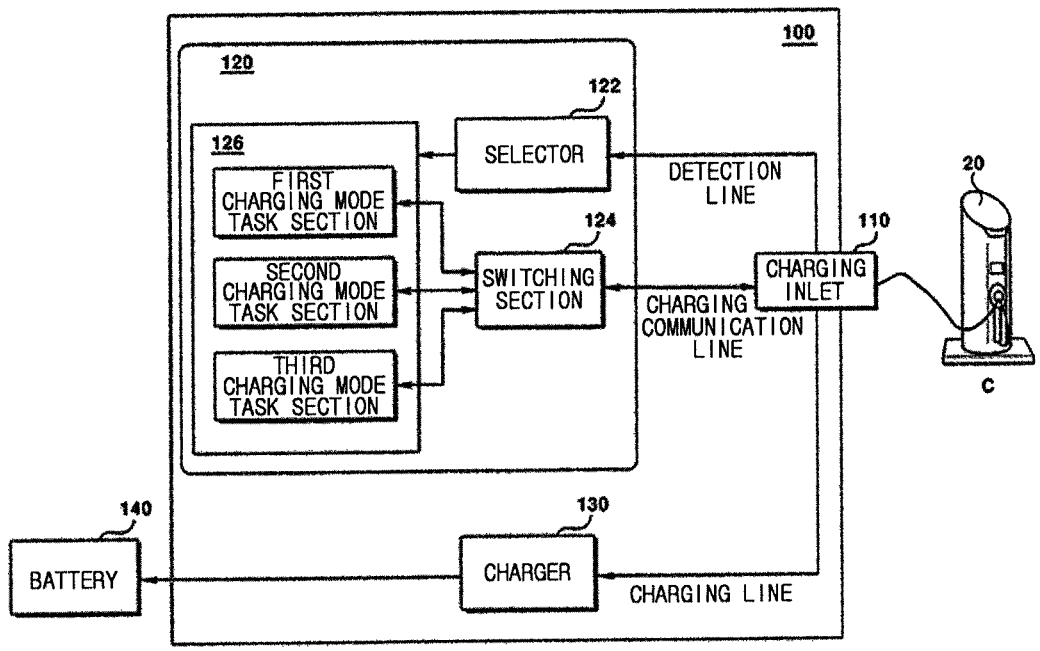
FIG. 6 is a view for describing an operation of performing charging of the electric vehicle charging device (100) connected to an electric vehicle supply equipment (EVSE) (20) according to one embodiment of the present disclosure.

FIG. 6 is a view for describing an operation of performing charging of the electric vehicle charging device 100 connected to an EVSE 20 according to one embodiment of the present disclosure. Since the operations of the elements are described with reference to FIG. 5, repetitive descriptions will be omitted. The charging inlet 110 is connected to the EVSE 20 and collects the charging information from the EVSE 20. In this case, the collected charging information may be transmitted to the selector 122 through a detection line. The switching section 124 and the charging inlet 110 may be connected by a charging communication line. Further, the charging inlet 110 may be connected with the charger 130 through a charging line. In addition, the charging inlet 110 may be connected with the selector 122 through the detection line.

Figure 7:
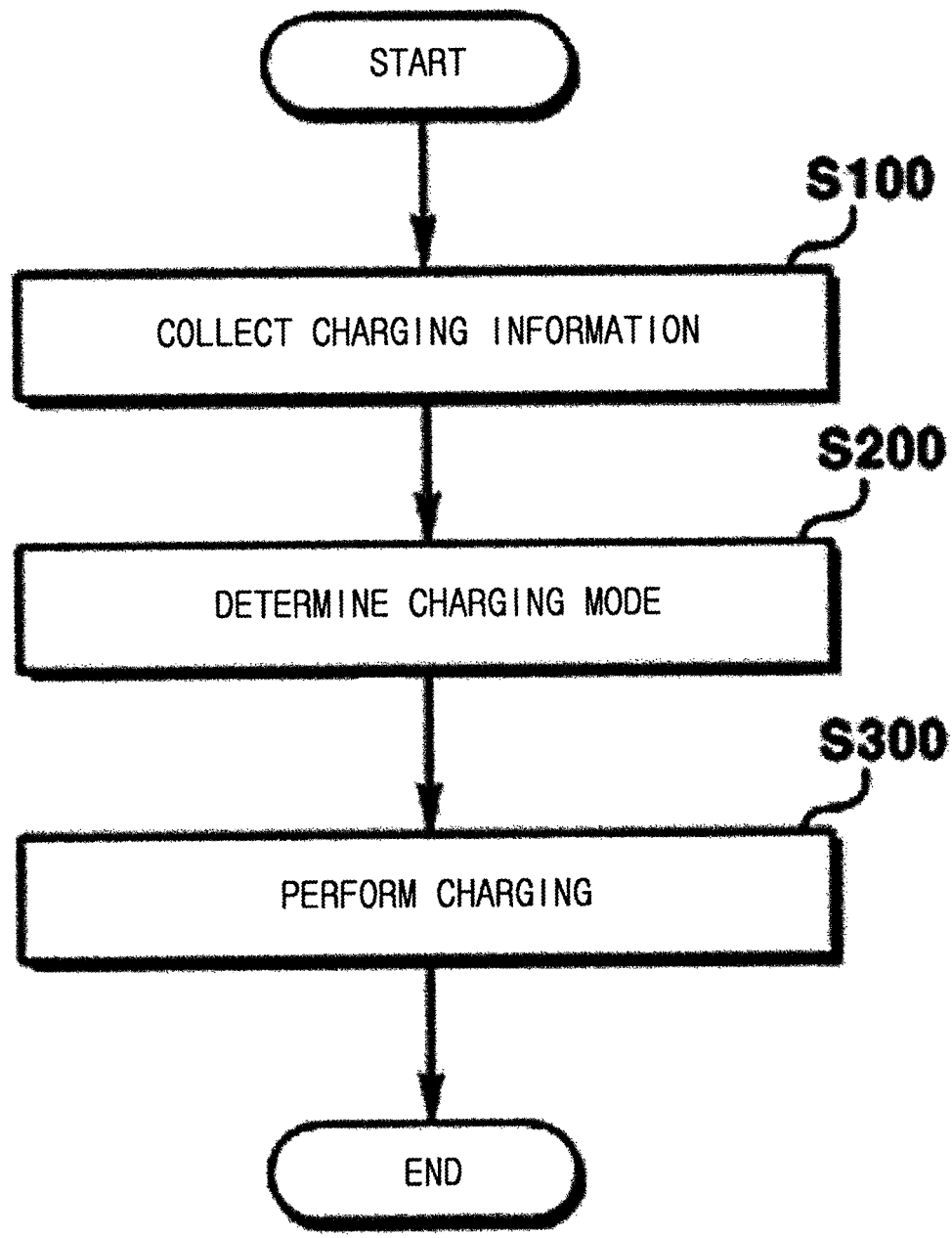
FIG. 7 is a flowchart of a method of charging an electric vehicle according to one embodiment of the present disclosure.

FIG. 7 is a flowchart of a method of charging an EV according to one embodiment of the present disclosure. As shown in FIG. 7, the method of charging the EV according to the present disclosure includes operations of collecting the charging information (S100), determining the charging mode (S200), and performing charging (S300). As described above, the charging information is collected from the connected external EVSE (S100), the charging information including the cable information, the charging type information, the charging voltage/current information, the rated voltage, the charging time information, etc. On the basis of the collected charging information, the corresponding charging mode is determined (S200). The charging mode may include a combo mode, a first combo type mode, a second combo type mode, a CHAdeMO mode, an AC 3-phase mode, and/or a GB/T (China DC) mode. When the charging mode is determined, the battery of the EV is charged in the corresponding charging mode (S300).

Meanwhile, the communication method between the EVSE 2Q and the charging device 10Q may vary depending on the standards. For example, the PLC is used for communication between the EVSE 20 and the charging device 100 in the case of CCS standards, but a controller area network (CAN) is used for communication between the EVSE 20 and the charging device 100 in the case of CHAdeMo standards and China EV charging standards.

Below, it will be described by way of example that the charging device 100 according to one embodiment of the present disclosure further includes a charging controller in order to support communication methods different according to the standards.

Figure 8:
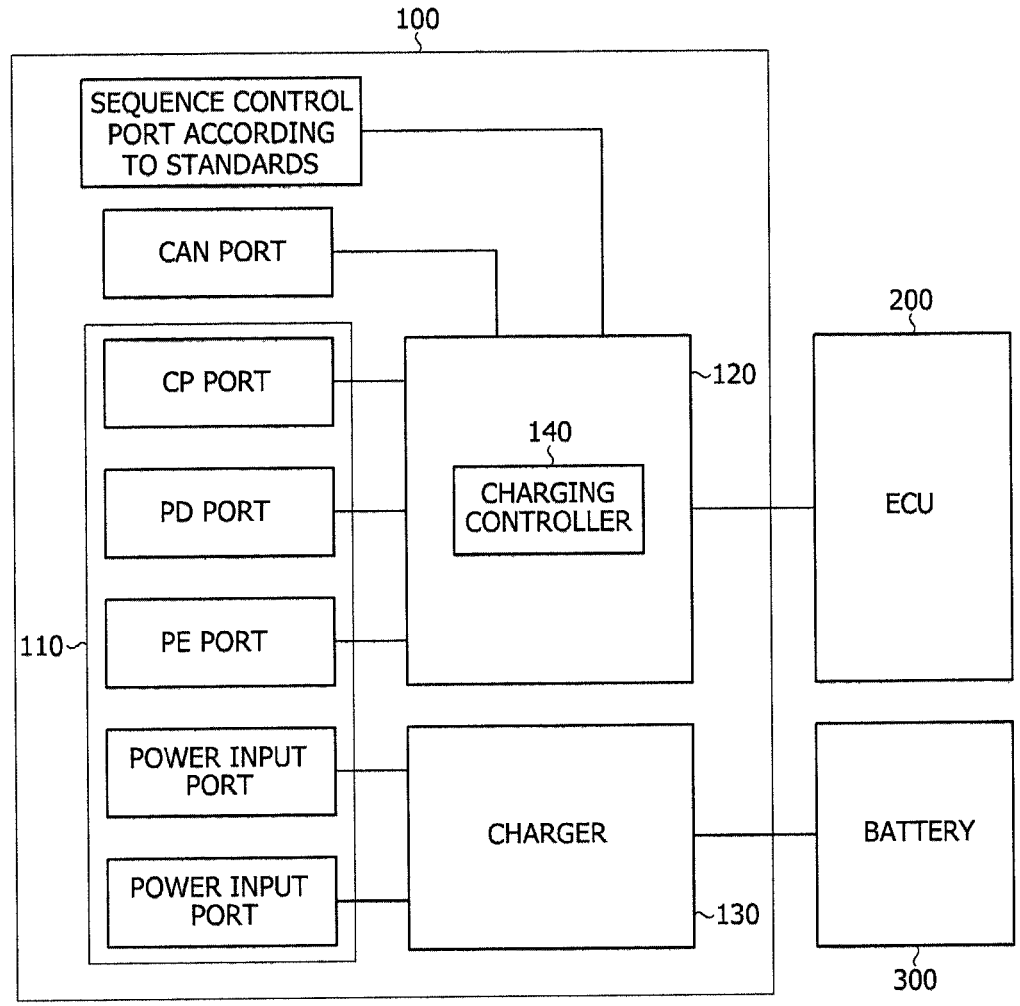
FIG. 8 is a block diagram of a charging device according to one embodiment of the present disclosure.
Figure 9:
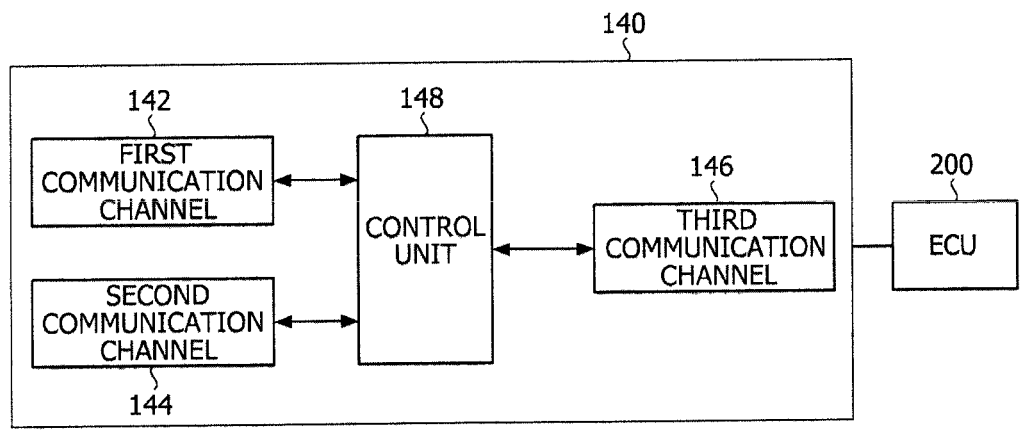
FIG. 9 is a block diagram of a charging controller included in the charging device according to one embodiment of the present disclosure.

FIG. 8 is a block diagram of a charging device according to one embodiment of the present disclosure, and FIG. 9 is a block diagram of a charging controller included in the charging device according to one embodiment of the present disclosure.

Referring to FIG. 8, the charging inlet 110 of the charging device 100 for the EV 10 includes a control pilot (CP) port, a proximity detection (PD) port, a protective earth (PE) port, and a power input port.

Here, the CP port is a port for receiving a CP signal through the charging cable connected to the EVSE.

The PD port is a port for sensing the proximity of the charging cable to the connector.

The PE port is a port to be connected to a ground of the EVSE 20.

A charging controller 140 controls charging of the battery 300. Although it is not illustrated, the charging controller 140 may be included in the control module 120, and connected to at least one of the selector 122, the switching section 124, and the task section 126 in the control module 120. Alternatively, the charging controller 140 may be provided separately from the control module 120 and operate independently.

The charging controller 140 may include pilot function (PF) logic for processing a pilot function received through the CP port, and proximity detection (PD) logic for detecting whether the connector of the EVSE 20 is inserted or not using a signal received through the PD port.

When the charging controller 140 receives a signal through the CP port and a signal through the PD port, the charging controller 140 controls the charger 130 connected to the power input port so that the battery 300 may receive charging power from the EVSE 20. The charging controller 140 may be interchangeably used with an electric vehicle communication controller (EVCC).

Referring to FIG. 9, the charging controller 140 in the charging device 100 includes a first communication channel 142, a second communication channel 144, a third communication channel 146, and a control unit 148.

Here, a signal is transmitted and received between the EVSE 20 and the charging controller 140 through the first communication channel 142 and the second communication channel 144. In this case, the first communication channel 142 and the second communication channel 144 may be different in protocol from each other. For example, the first communication channel 142 may be based on a protocol of supporting power line communication (PLC), pulse width modulation (PWM), or both the PLC and the PWM, and the second communication channel 144 may be based on a protocol of supporting the controller area network (CAN).

Further, the control unit 148 is connected to the first communication channel 142 and the second communication channel 144, and generates a signal for controlling the charging of the battery by using a signal received through the first communication channel 142 or the second communication channel 144. In this case, the control unit 148 processes a signal in accordance with the a protocol of supporting the PLC when the signal is received through the first communication channel 142, and processes a signal in accordance with the protocol of supporting the CAN when the signal is received through the second communication channel 144.

Thus, the charging device 100 according to one embodiment of the present disclosure may support all the representative standards for charging the EV, i.e. combined charging system (CCS) standards, CHArge de Move (CHAdeMo) standards, and China EV charging standards because it may be connected to the EVSE 20 through the first communication channel 142 in accordance with the CCS standards or be connected to the EVSE 20 through the second communication channel 144 in accordance with the CHAdeMo or China EV charging standards. Here, the EVSE 20 connected with the first communication channel 142 and the EVSE 20 connected with the second communication channel 144 may be the same EVSE or different EVSEs. For example, one EVSE may include all interfaces that comply with the CCS standards, the CHAdeMo standards, and the China EV charging standards, or may include one of the interfaces that comply with the CCS standards, the CHAdeMo standards, and the China EV charging standards.

Meanwhile, the control unit 148 is connected to the third communication channel 146, and a signal generated by the control unit 148 to control the charging of the battery is transmitted to the ECU 200 through the third communication channel 146. In this case, the third communication channel 146 may be based on the protocol of supporting the CAN. Therefore, the control unit 148 may be controlled by the ECU 200 for controlling the EV 10.

Figure 10:
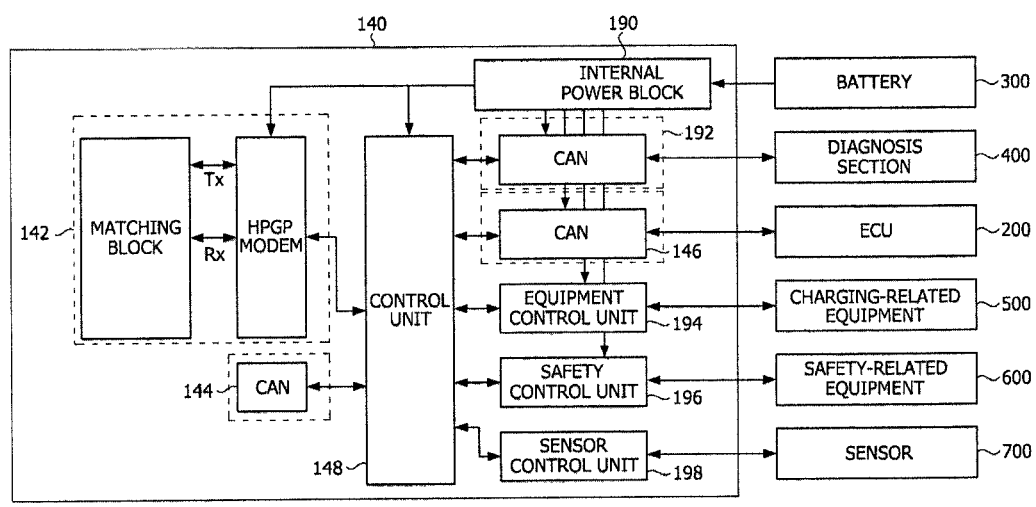
FIG. 10 is a block diagram illustrating the charging controller in more detail according to one embodiment of the present disclosure.

FIG. 10 is a block diagram illustrating the charging controller in more detail according to one embodiment of the present disclosure.

Referring to FIG. 10, the charging controller 140 in the charging device 100 includes the first communication channel 142, the second communication channel 144, the third communication channel 146, and the control unit 148. Further, the first communication channel 142 is based on the protocol of supporting the PLC, and the second communication channel 144 and the third communication channel 146 are based on the protocol of supporting the CAN.

To this end, the first communication channel 142 may include a matching block and a home plug green PHY (HPGP) modem. The first communication channel 142 may use the matching block to match the signal to be received from the EVSE 20 or transmitted to the EVSE 20, and use the HPGP modem to perform PLC communication.

Further, the control unit 148 may generate a control signal for the charging of the battery by processing a signal received through the first communication channel 142 or the second communication channel 1447. In this case, the control unit 148 processes a signal in accordance with the protocols of supporting the PLC when the signal is received through the first communication channel 142, and processes a signal in accordance with the protocol of supporting the CAN when the signal is received through the second communication channel 144.

In addition, the control unit 148 is connected to the third communication channel 146, and a signal generated by the control unit 148 to control the charging of the battery is transmitted to the ECU 200 through the third communication channel 146.

Meanwhile, the charging device 100 according to one embodiment of the present disclosure may further have an additional function.

For example, the charging controller 140 according to one embodiment of the present disclosure may further include an internal power block (& protections) 190 to be connected with the battery 300 of the EV 10. Thus, standby power may be supplied to the charging controller 140 even when the EV 10 stalls or the charging controller 140 is in a sleep mode.

In addition, the charging controller 140 according to one embodiment of the present disclosure may further include a fourth communication channel 192 to be connected with a diagnosis section 400 of the EV 10. In this case, the fourth communication channel 192 may be based on the protocol of supporting the CAN. Therefore, a signal is transmitted from the diagnosis section 400 of the EV 10 to the charging controller 140 via the fourth communication channel 192, thereby controlling the charging device 100. Further, the signal generated by the charging controller 140 is transmitted to the diagnosis section 400 of the EV 10 via the fourth communication channel 192, so that the diagnosis section 400 may diagnose a failure or abnormality of the charging device 100 on the basis of the received signal.

Here, the third communication channel 146 and the fourth communication channel 192 are provided separately from each other, but are not limited thereto. Alternatively, the third communication channel 146 and the fourth communication channel 192 may be integrated into a single communication channel.

Besides, the charging controller 140 according to the embodiment of the present disclosure further includes an equipment control unit (controls & drivers) 194 which may be connected to charging-related equipment (in vehicle sensors & controllable functions) 500 of the EV 10. The equipment control unit 194 transmits a signal between the control unit 148 of the charging controller 140 and the charging-related equipment 500 of the EV 10, thereby controlling the charging-related equipment 500 in the EV 10, or sensing a failure or abnormality of the charging-related equipment 500.

Further, the charging controller 140 according to one embodiment of the present disclosure further includes a safety control unit (safety loop) 196 which may be connected to safety-related equipment (safety function on vehicle) 600 of the EV 10. The safety control unit 196 transmits a signal between the control unit 148 of the charging controller 140 and the safety-related equipment 600 of the EV 10, thereby controlling the safety-related equipment 600 of the EV 10, or sensing a failure or abnormality of the safety-related equipment 600.

In addition, the charging controller 140 according to one embodiment of the present disclosure further includes a sensor control unit 198 which may be connected to a sensor 700 of the EV 10. The sensor control unit 198 transmits a signal between the control unit 148 of the charging controller 140 and the sensor 700 of the EV 10, thereby controlling the sensor 700 of the EV 10, or sensing a failure or abnormality of the sensor 700.

Although exemplary embodiments have been illustrated and described, it will be understood by those skilled in the art that various modification and changes may be made in the embodiments without departing from the idea and scope of the present inventive concept, which are defined in the appended claims and their equivalents.

DESCRIPTION OF REFERENCE NUMERALS

10: electric vehicle
20: electric vehicle supply equipment
100: charging device

The invention claimed is:

1. A device for charging an electric vehicle, the device comprising:
   a charging inlet configured to receive charging information and power from electric vehicle supply equipment (EVSE);
   a control module configured to determine a charging mode based on the charging information and output a control signal in accordance with the determined charging mode; and
   a charger configured to charge a battery of the electric vehicle in accordance with the control signal of the control module,
   wherein the charging mode is determined by a charging standard of the EVSE.

2. The device of claim 1, wherein the control module comprises:
   a selector configured to determine the charging mode based on the charging information received from the charging inlet;
   a switching section configured to select a task section corresponding to the selected charging mode on the basis of information of the selector; and
   a plurality of task sections configured to output control signals corresponding to different charging modes so that charging in the different charging modes is performed.

3. The device of claim 1, wherein the charging information comprises one or more selected from the group consisting of cable information, charging type information, charging voltage/current information, a rated voltage, and charging time information.

4. The device of claim 2, wherein the different charging modes comprise two or more selected from the group consisting of a combo mode, a first combo type mode, a second combo type mode, a CHAdeMO mode, an AC 3-phase mode, and a GB/T (China DC) mode.

5. The device of claim 2, wherein the switching section comprises one selected from the group consisting of a metal oxide semiconductor field effect transistor (MOSFET), a gate turn off (GTO) thyristor, an insulated gate bipolar transistor (IGBT), and a silicon controlled rectifier (SCR).

6. The device of claim 1, further comprising an inverter.

7. The device of claim 1, further comprising a communicator configured to communicate with the EVSE.

8. A device for charging an electric vehicle, the device comprising:
- a charging inlet configured to receive charging information and power from electric vehicle supply equipment (EVSE);
- a control module configured to determine a charging mode based on the charging information and output a control signal in accordance with the determined charging mode;
- a charger configured to charge a battery of the electric vehicle in accordance with the control signal of the control module;
- a first communication channel configured to be connected with the EVSE;
- a second communication channel configured to be connected with the EVSE;
- a third communication channel configured to be connected with an electronic control unit (ECU) of the electric vehicle; and
- a charging controller comprising a control unit connected to the first communication channel, the second communication channel, and the third communication channel, configured to generate a signal for controlling charging of the battery using a signal received through the first communication channel or the second communication channel, and configured to transmit the signal for controlling the charging of the battery to the ECU through the third communication channel.

9. The device of claim 8, wherein the first communication channel and the second communication channel are based on different protocols from each other.

10. The device of claim 9, wherein the first communication channel is based on a protocol of supporting at least one of power line communication (PLC) and pulse width modulation (PWM), and the second communication channel is based on a protocol of supporting a controller area network (CAN).

11. The device according to claim 10, wherein the third communication channel is based on the protocol of supporting the CAN.

12. A method of charging an electric vehicle, the method comprising:
- collecting charging information from electric vehicle supply equipment (EVSE);
- determining a charging mode based on the charging information; and
- performing charging of the electric vehicle in accordance with the determined charging mode,
- wherein the charging mode is determined by a charging standard of the EVSE.

13. The method of claim 12, wherein the charging information comprises one or more selected from the group consisting of cable information, charging type information, charging voltage/current information, a rated voltage, and charging time information.

14. The method of claim 12, wherein the charging mode comprises one or more selected from the group consisting of a combo mode, a first combo type mode, a second combo type mode, a CHAdeMO mode, an AC 3-phase mode, and a GB/T (China DC) mode.

* * * * *